(12) United States Patent
Isomura et al.

(10) Patent No.: US 8,384,797 B2
(45) Date of Patent: Feb. 26, 2013

(54) SYSTEM, METHOD, AND COMPUTER READABLE MEDIUM FOR DEFINING AN ALLOWABLE RANGE OF IMAGE PROCESSING

(75) Inventors: Ayumu Isomura, Minato-ku (JP); Shuji Ono, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 30 days.

(21) Appl. No.: 13/033,191

(22) Filed: Feb. 23, 2011

(65) Prior Publication Data

US 2011/0141313 A1     Jun. 16, 2011

Related U.S. Application Data

(60) Division of application No. 11/896,876, filed on Sep. 6, 2007, now Pat. No. 7,920,173, which is a continuation of application No. PCT/JP2006/304848, filed on Mar. 7, 2006.

(30) Foreign Application Priority Data

Mar. 7, 2005    (JP) ................................. 2005-062882
Jan. 27, 2006   (JP) ................................. 2006-019540

(51) Int. Cl.
*H04N 5/228* (2006.01)
(52) U.S. Cl. ................................. 348/222.1; 348/333.02
(58) Field of Classification Search .................. 348/22.1, 348/231.99, 333.02
See application file for complete search history.

(56) References Cited

U.S. PATENT DOCUMENTS

| | | | |
|---|---|---|---|
| 5,937,214 A | 8/1999 | Shintani et al. | |
| 2002/0018138 A1* | 2/2002 | Yoshiro | 348/333.05 |
| 2002/0118285 A1 | 8/2002 | Misawa et al. | |
| 2002/0154147 A1 | 10/2002 | Battles | |
| 2002/0196197 A1* | 12/2002 | Watanabe | 345/1.1 |
| 2003/0030669 A1 | 2/2003 | Ono | |
| 2004/0017481 A1* | 1/2004 | Takasumi et al. | 348/207.99 |
| 2006/0221198 A1* | 10/2006 | Fry et al. | 348/222.1 |
| 2007/0226169 A1 | 9/2007 | Solyanik et al. | |

FOREIGN PATENT DOCUMENTS

| | | | |
|---|---|---|---|
| JP | 2002-158901 A | 5/2002 | |
| JP | 2003-299028 A | 10/2003 | |
| JP | 2003-344933 A | 12/2003 | |
| JP | 2004-064383 A | 2/2004 | |
| WO | WO 98/34400 A1 | 8/1998 | |

* cited by examiner

*Primary Examiner* — Gevell Selby
(74) *Attorney, Agent, or Firm* — Birch, Stewart, Kolasch & Birch, LLP

(57) ABSTRACT

According to the present invention, the album including user's favorite pictures as main features can be easily provided. The system includes; a image capturing section which captures an image; an image capturing time measuring section which measures the time after setting the image capturing section ready to capture the image and while the user continues to operate the image capturing section to capture the image in each image capturing operation of the image capturing section; a ranking calculating section which ranks the image based on the image capturing time calculated by the image capturing time measuring section; and an output controlling section which displays or prints out the image ranked more highly by the ranking calculating section.

19 Claims, 9 Drawing Sheets

228

| TYPE OF CHANGE | AMOUNT OF CHANGE |
|---|---|
| CHANGED AREA | < 30 % |
| THE NUMBER OF THE CHANGED OBJECTS | < 33 % |
| BRIGHTNESS HISTOGRAM | < 20 % |
| COLOR HISTOGRAM | < 20 % |
| TEXTURE | < 25 % |
| ⋮ | ⋮ |

*FIG. 4*

| PHOTOGRAPHIC PARAMETER | | ALLOWABLE RANGE |
|---|---|---|
| FIELD ANGLE $\alpha_1$ | CHANGE IN FIELD ANGLE $+\Delta\alpha_2$ | TRIMMED RANGE $\geq \alpha_3$% |
| ⋮ | ⋮ | ⋮ |
| APERTURE VALUE $\beta_1$ | CHANGE IN APERTURE VALUE $+\Delta\beta_2$ | CORRECTION VALUE OF BRIGHTNESS $\leq \beta_3$ |
| ⋮ | ⋮ | ⋮ |

FIG. 8

SYSTEM, METHOD, AND COMPUTER READABLE MEDIUM FOR DEFINING AN ALLOWABLE RANGE OF IMAGE PROCESSING

CROSS REFERENCE TO RELATED APPLICATIONS

This application is a Divisional of copending application Ser. No. 11/896,876 filed on Sep. 6, 2007, and for which priority is claimed under 35 U.S.C. §120. application Ser. No. 11/896,876 is Continuation of PCT International Application No. PCT/JP2006/304848 filed on Mar. 7, 2006. The entire contents of each of the above-identified applications are hereby incorporated by reference.

TECHNICAL FIELD

The invention relates to an image output system, an image capturing apparatus, an output apparatus, an image output method, an image capturing method, an output method, and a computer readable medium. Especially, the invention relates to an image output system, an image capturing apparatus, an output apparatus, an image output method, an image capturing method, an output method, each of which is required to output an image, and a computer readable medium storing thereon a program used for the image capturing apparatus and the output apparatus.

The present application claims priority from a Japanese Patent Applications Nos. JP2005-062882 filed in JP on Mar. 7, 2005 and JP2006-19540 filed in JP on Jan. 27, 2006, the contents of which are incorporated herein by reference if applicable.

BACKGROUND ART

A conventional art, for example, Japanese patent application publication No. 1998-126731, discloses that the album in which photo images taken while traveling are laid out in a map there with the indication where to take the photos. In the album, the map is arrayed in the middle of the screen, and the photo images arranged around the map are connected by lines to the photo-taken spots on the map by means of the location information related with the photo images and the tag information such as the photo-taken time so that the relation of the map and the images is clearly shown.

DISCLOSURE OF THE INVENTION

Problems to be Solved by the Invention

The album made according to the Japanese patent application publication No. 1998-126731 cannot always display the user's favorite photo images in prominent positions therein. The user is likely to hope the photo image which was taken carefully and thoroughly are used in the album cover, or displayed prominently. The user is likely to hope to make the album easily without troublesome procedures such as selecting and editing images.

To solve the above problem the invention has the purpose of providing the image output system, the image capturing apparatus, the output apparatus, the image output method, the image capturing method, the output method, and the programs. The present purpose can be achieved by the combination of the elements described in the independent claims in the range of what we claim. The dependent claims add useful embodiments of the present invention.

Means for Solving the Problems

The first embodiment of the present invention includes; an image capturing section which captures an image; a image capturing time measuring section which measures the time after setting the image capturing section ready to capture the image and while the user continues to operate the image capturing section to capture the image in each image capturing operation of the image capturing section; a ranking calculating section which ranks the image based on the image capturing time calculated by the image capturing time measuring section; and an output controlling section which displays or prints out the image ranked more highly by the ranking calculating section.

The image capturing time measuring section may measure the time from setting the image capturing section ready for capturing an image of an object to finishing capturing the image of the object. The image capturing time measuring section may measure the time after setting the image capturing section ready for capturing the image of the object and while the user continues the image capturing section to capture the image of the object.

The output controlling section may display or print out the image which is ranked more highly by the ranking calculating section. The output controlling section may display the image which is ranked more highly by the ranking calculating section for longer time.

The first embodiment of the present invention may further includes; a auxiliary image capturing section in which plurality of auxiliary images captured sequentially at the timing before the image capturing section captures the image; a composition change amount detecting section in which the amount of change in composition in the plurality of the auxiliary images captured by the auxiliary image capturing section; and an operation controlling section which decides whether the user operates the image capturing section to capture the image based on the amount of change in composition detected by said composition change amount detecting section. If the operation controlling section detects no user's operation while the image capturing section is ready to capture an image of an object and captures the image, the image capturing time measuring section may measure the time from which the operation controlling section decides there is no image capturing operation to which the image capturing section captures the image.

The composition change amount detecting section detects the identical area of the image in sequentially captured auxiliary images by the auxiliary image capturing section. The operation controlling section may decide no image capturing operation by the user when the area detected by composition change amount detecting section is smaller area than the predetermined.

The first embodiment of the present invention further includes; a criteria storing section in which criteria for detecting there is no user's image capturing operation as relating to the type and amount of change in composition. The composition change amount detecting section detects the amount of change in composition of plurality of auxiliary images captured by the auxiliary image capturing section for every type of change stored in criteria storing section. The operation controlling section may detect no image capturing operation by the user when the composition change amount detecting section detects the type of change and the amount of change in composition match the criteria stored in the criteria storing section.

The image output method according to the second embodiment of the present invention includes; an image capturing procedure in which an image is captured; an image capturing time measuring procedure in which the time required for each image capturing operation in the image capturing procedure is measured; a ranking procedure in which the image captured in the image capturing procedure is ranked based on the image capturing time measured in the image capturing time measuring procedure; and an output controlling procedure in which more highly ranked image in the ranking procedure is output preferentially.

The image capturing apparatus according to the third embodiment of the present invention includes; an image capturing section which captures an image; an image capturing time measuring section which measures the time required for each image capturing operation the image capturing section to capture the image; a ranking calculating section which ranks the images captured by the image capturing section based on the image capturing time measured by the image capturing time measuring section; and a ranking data storing section which stores the ranking data given by the ranking calculating section as relating to the images captured by the image capturing section.

The ranking calculating section may more highly rank the image which is required longer time to be captured which is measured by the image capturing time measuring section.

The image capturing method according to the fourth embodiment of the present invention includes; an image capturing procedure in which an image is captured; an image capturing time measuring procedure in which the time required for each image capturing operation in the image capturing procedure is measured; a ranking procedure in which the image captured in the image capturing procedure is ranked based on the time required for capturing the image measured in the image capturing time measuring procedure; and a ranking data storing procedure in which the ranking data of the image ranked in the ranking procedure as relating to the image captured in the image capturing procedure.

The computer readable medium storing thereon a program for an image capturing apparatus which captures an image according to the fifth embodiment of the present invention functions the image capturing apparatus which includes; an image capturing section which captures an image; a image capturing time measuring section which measures the time required for each image capturing operation of the image capturing section; a ranking calculating section which ranks the image captured by the image capturing section based on the time measured by the image capturing time measuring section; and a ranking data storing section which stores the ranking data of the image ranked by the ranking calculating section as relating to the image captured by the image capturing section.

The output device according to the sixth embodiment of the present invention includes; an image storing section which stores the image captured by the image capturing apparatus; an image capturing time storing section which records the time required for the image capturing apparatus to capture each image, which is stored in the image storing section; a ranking calculating section which ranks the image stored in the image storing section based on the image capturing time stored in the image capturing time storing section; and an output controlling section which controls the image more highly ranked by the ranking calculating section is output preferentially.

The output method according to the seventh embodiment of the present embodiment includes; an image storing procedure in which the image captured by the image capturing apparatus is stored; an image capturing time storing procedure in which the time required for the image capturing apparatus to capture each image stored in the image storing section; a ranking procedure in which the image stored in the image storing procedure is ranked based on the time stored in the image capturing time storing procedure; and an output controlling procedure in which the image more highly ranked in the ranking procedure is output preferentially.

The computer readable medium storing thereon a program for an output device which outputs an image according to the eighth embodiment of the present invention functions the output device which includes; an image storing section which stores the image captured by the image capturing apparatus; an image capturing time storing section which stores the time required for the image capturing apparatus to capture each image stored in the image storing section; a ranking calculating section which ranks the image stored in the image storing section based on the time stored in the image capturing time storing section; and an output controlling section which outputs the image more highly ranked by the ranking calculating section preferentially.

The image output system according to the ninth embodiment of the present invention includes; an image capturing section which captures an image; an photographic parameters acquiring section which acquires the change in photographic parameters changed by the user's operation while capturing the image by the image capturing section as relating to the image captured by the image capturing section; an image processing determining section which defines the allowable range of processing the image captured by the image capturing section to be output; and an image processing plan presenting section which displays the allowable range of image processing defined by the image processing determining section to the user.

The image output system according to the ninth embodiment of the present invention further includes; an image processing section which provides the image captured by the image capturing section with the image processing operation within the range allowed by the image processing controlling section; and an output section which outputs the image processed by the image processing section.

The photographic parameters acquiring section may obtain the change in photographic parameters changed by the user after the image capturing section is ready to capture the image of the object and until it finishes capturing it.

The photographic parameters acquiring section may obtain the filed angle and the amount of change in filed angle which are resulted from the user's operation until said image capturing section captures the image as relating to the image captured by said image capturing section. The image processing determining section may define the allowable range of trimming when the image captured by the image capturing section is trimmed and output. The image processing plan presenting section may display the allowable trimming range defined by the image processing determining section to the user.

The image output method according to the tenth embodiment of the present invention includes; an image capturing procedure in which an image is captured; an photographic parameters acquiring procedure in which the change in photographic parameters changed by the user's operation until the image is captured are acquired as relating to the image captured in the image capturing procedure; and an image processing determining procedure in which the allowable range of processing the image captured in said image capturing procedure to be output is defined based on the change in photographic parameters acquired in said photographic parameters acquiring procedure, and the defined allowable range of image processing is displayed to the user.

The image capturing apparatus according to the eleventh embodiment of the present invention includes; an image capturing section which captures an image; an photographic parameters acquiring section which acquires the change in photographic parameters changed by the user's operation while capturing the image by said image capturing section as relating to the image captured by said image capturing section; an image processing determining section which defines the allowable range of processing the image captured by said image capturing section to be output based on the change in photographic parameters acquired by said photographic parameters acquiring section; and an image processing plan storing section which stores the allowable range of image processing defined by the image processing determining section as relating to the image captured by the image capturing section.

The image capturing method of the twelfth embodiment of the present invention includes; an image capturing procedure in which an image is captured; an photographic parameters acquiring procedure in which the change in photographic parameters changed by the user's operation while capturing the image by said image capturing section is acquired as relating to the image captured by said image capturing procedure; an image processing determining procedure in which the allowable range of image processing is defined when the image captured by the image capturing section is output based on the change in photographic parameters acquired in said photographic parameters acquiring procedure; and an image processing plan storing procedure in which the allowable range of image processing defined by the image processing determining section is stored as relating to the image captured by the image capturing section.

The computer readable medium storing thereon a program for an image capturing apparatus which captures an image of the thirteenth embodiment of the present invention functions the image capturing apparatus which includes; an image capturing section which captures an image; an photographic parameters acquiring section which acquires the change in photographic parameters changed by the user's operation until the image capturing section captures the image as relating to the image captured by the image capturing section; an image processing determining section which defines the allowable range of processing the image captured by the image capturing section to be output based on the change in photographic parameters acquired by the photographic parameters acquiring section; and an image processing plan storing section which stores the allowable range of image processing defined by the image processing determining section as relating to the image captured by the image capturing section.

The output device of the fourteenth includes; an image storing section which stores an image captured by an image capturing apparatus; a photographic parameters acquiring section which acquires the change in photographic parameters changed by the user's operation until the image capturing section captures the image as relating to the image captured by the image capturing section; an image processing determining section which defines the allowable range of image processing when the image captured by the image capturing section is output based on the change in photographic parameters stored in said photographic parameters storing section; and an image processing plan presenting section in which the allowable range of image processing defined by the image processing determining section is displayed to the user.

The output method of the fifteenth embodiment of the present invention includes; an image storing procedure in which the image captured by the image capturing apparatus is stored; a photographic parameters storing procedure in which the change in photographic parameters changed by the user's operation until the image is captured by said image capturing apparatus as relating to the image stored in said image storing procedure; an image processing determining procedure in which the allowable range of processing the image stored in the image storing procedure when the image stored in image storing procedure is output is defined based on the change in photographic parameters stored in the photographic parameters storing procedure; and a image processing plan displaying procedure in which the allowable range of image processing defined in the image processing determining procedure is displayed to the user.

The computer readable medium storing thereon a program for an output device which outputs an captured image of the sixteenth embodiment of the present invention functions the output device which includes; an image storing section which stores an image captured by an image capturing apparatus; an photographic parameters storing section which stores the change in photographic parameters changed by the user's operation until the image capturing section captures the image as relating to the image captured by the image capturing section; an image processing determining section which defines the allowable range of processing the image stored in the image storing section to be output based on the change in photographic parameters stored in the photographic parameters storing section; and an image processing plan presenting section which displays the allowable range of image processing defined by the image processing determining section.

The above summary of the present invention doesn't include all of the necessary features. The sub-combinations of these features may be inventions.

Effect of the Invention

According to the invention, the album in which user's favorite pictures are arranged distinctly is provided.

BRIEF DESCRIPTION OF THE DRAWINGS

FIG. 4 is a table including criteria stored in the criteria storing section 228.

FIG. 8 is a table including the parameters used for the image processing determining section 674 to define the allowable range of image processing.

DESCRIPTION OF THE NUMBERS

- 100 image capturing apparatus
- 140 output device
- 180 user
- 190 image output system
- 202 image capturing section
- 204 image storing section
- 206 image capturing time measuring section
- 208 image capturing time storing section
- 210 ranking calculating section
- 212 ranking data storing section
- 222 operation controlling section
- 224 composition change amount detecting section
- 226 auxiliary image capturing section
- 228 criteria storing section
- 230 identical area extracting section
- 232 object extracting section
- 234 Brightness histogram detecting section
- 236 color histogram detecting section
- 238 texture analysis section
- 244 image storing section
- 248 image capturing time storing section
- 250 ranking calculating section
- 254 output controlling section
- 256 output section
- 600 image capturing apparatus
- 602 image capturing section
- 604 image storing section
- 630 photographic parameters acquiring section
- 632 photographic parameters storing section
- 634 image processing determining section
- 636 image processing plan storing section
- 640 output device
- 644 image storing section
- 656 output section
- 672 photographic parameters storing section
- 674 image processing determining section
- 676 image processing plan storing section
- 678 image processing section
- 680 image processing plan presenting section
- 690 image output system

BEST MODE FOR CARRYING OUT THE INVENTION

The following description explains the present invention with embodiments. The embodiments described below do not limit the invention claimed herein. All of the combinations described on the embodiments are not essential to the solutions of the present invention.

Figure 1:
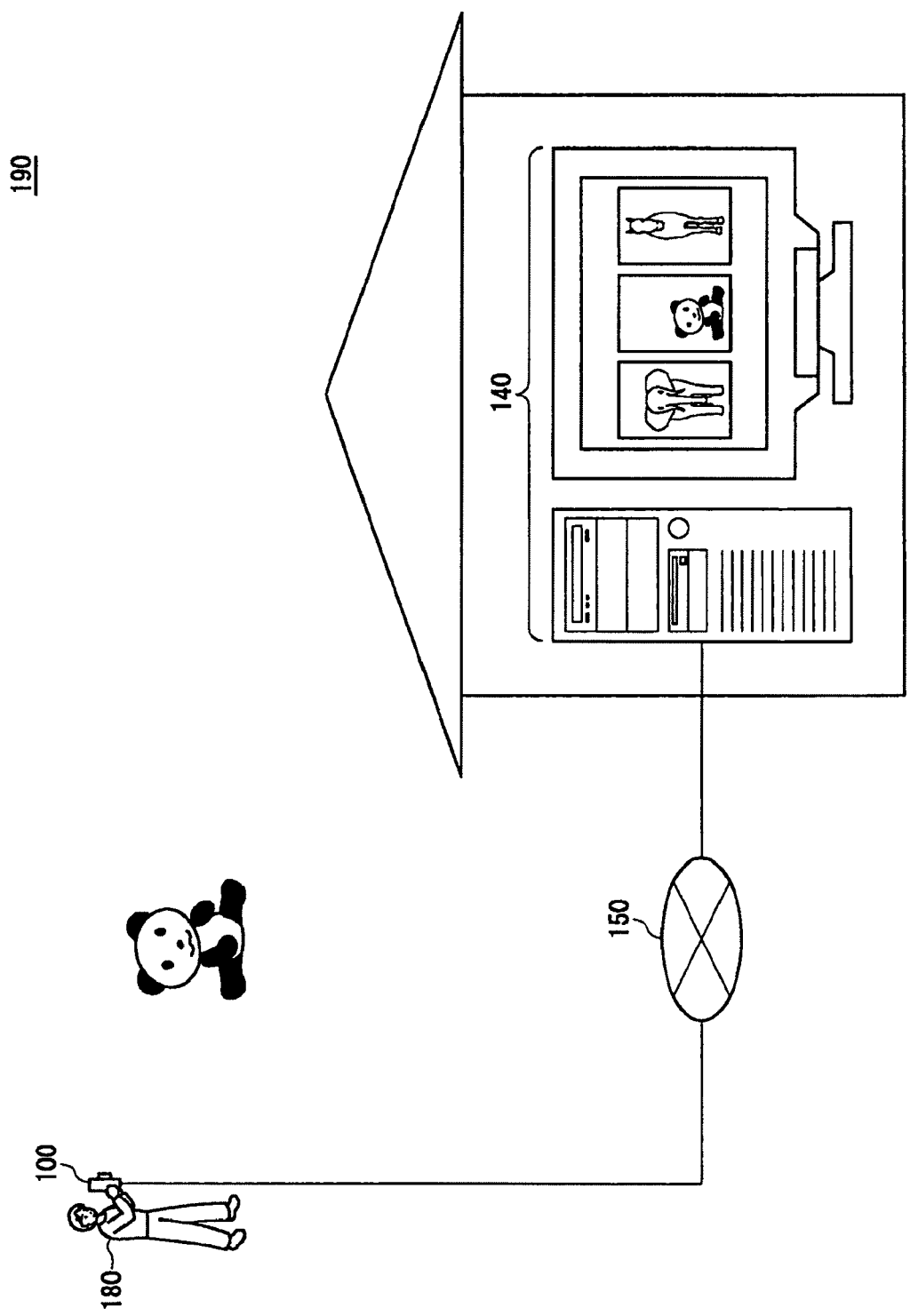
FIG. 1 shows an example of how the image output system 190 is used.

FIG. 1 shows an example of how to use the image output system 190 relating to an embodiment of the present invention. The image output system 190 includes an image capturing apparatus 100 and an output device 140. The image capturing apparatus 100 captures an image and records the time required for capturing the image. For example, the image capturing apparatus 100 records the time from turning on the power to finishing capturing the image. The output device 140 receives the image captured by the image capturing apparatus 100 and the time required for capturing the image. These data is transferred from the image capturing apparatus 100 to the output device 140 via a communication line 150 such as the Internet or various types of record media. The output device 140 displays the image which is required longer time to be captured in the center of the screen. For example, the output device 140 outputs and arranges the images required longer time to be captured in the album cover, in the center and major part of the page, and in the whole background of the page. Such images are treated distinctly.

The image capturing apparatus 100 records how photographic parameters are changed by the user until capturing the image. The image capturing apparatus 100, for example, records the amount of change in field angle in the operation the user 180. The output device 140 can trim the captured image significantly changed in filed angle than predetermined. In this case, the output device 140 controls the trimming operation by the user 180 so that the size of the trimmed image is larger than the predetermined size. Such control can prevent from over-trimming the image which the user deliberately captured with a wide angle. The image output system 190 can prevent from processing the image in the manner in which the user 180 doesn't intend while capturing the image.

The image capturing apparatus 100 may be a digital still camera, a camera-equipped cell phone, or a personal digital assistant (PDA) with a camera. The image capturing apparatus 100 may display the image taken longer time to be captured in the center of the screen in large size. The output device 140 may be a personal computer, a digital album, a high-definition television, or other display devices which can display plurality of images at the same time on a screen. The output device 140 may be a printer or other devices which can print and output an image.

The image capturing apparatus 100 may store the time required to capture the image in the directory which is included in a server connecting the communication line 150 and allocated for the user 180 as relating to the image capturing apparatus 100. The output device 140 may receive the image and the time required for capturing the image which are stored in the directory of the server which is allocated for the user 180.

According to the image output system 190, the album which can, for example, arrange the image which is taken carefully and cautiously as main features can be provided. The user 180 can enjoy seeing such album.

Figure 2:
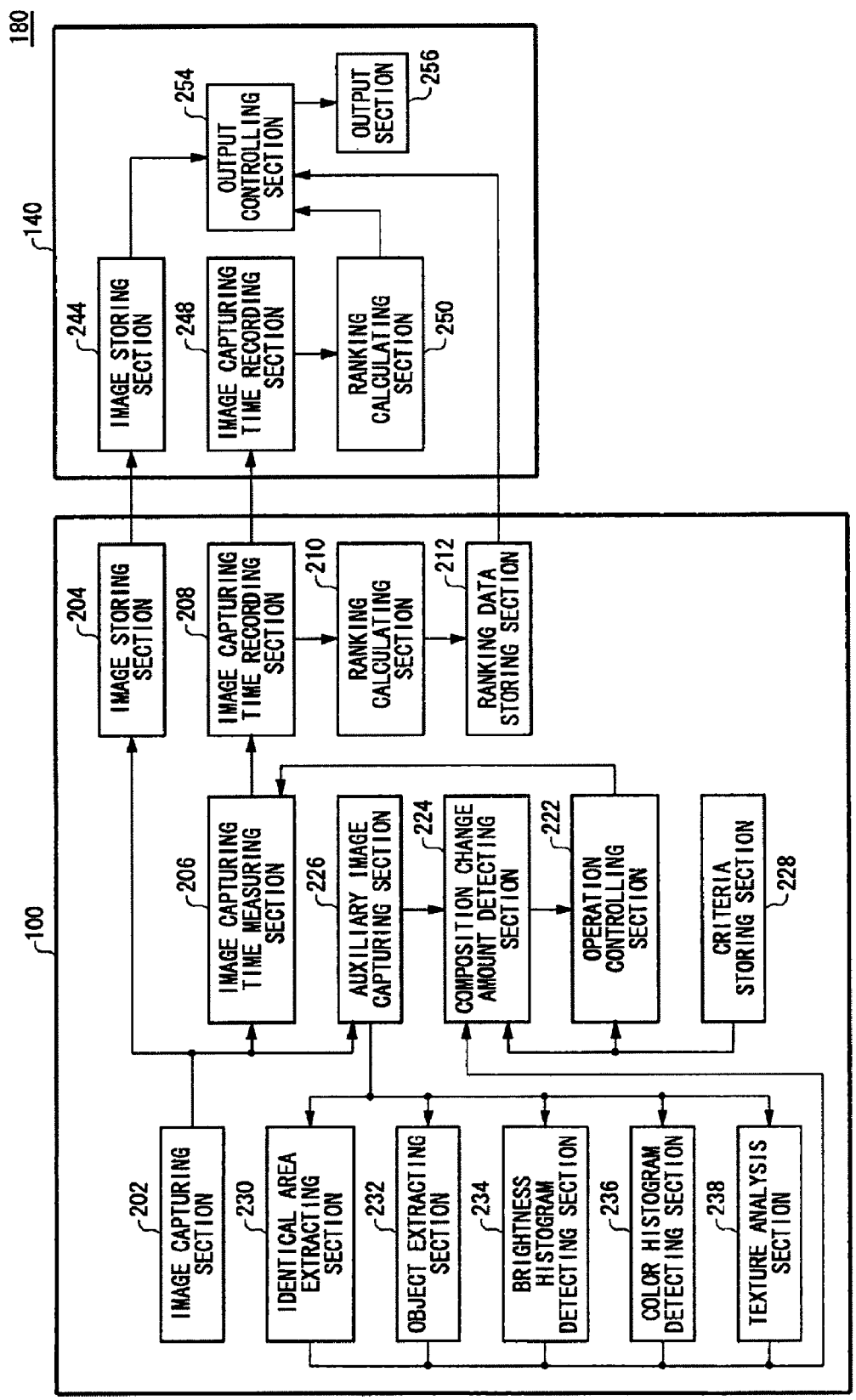
FIG. 2 is a block diagram showing the structure of the image output system 190.

FIG. 2 shows a block diagram of the image output system 190. The image capturing apparatus 100 includes an image capturing section 202, an image storing section 204, an image capturing time measuring section 206, an image capturing time storing section 208, a ranking calculating section 210, a ranking data storing section 212, an operation controlling section 222, a composition change amount detecting section 224, a auxiliary image capturing section 226, a criteria storing section 228, an identical area extracting section 230, an object extracting section 232, a Brightness histogram detecting section 234, a color histogram detecting section 236, and a texture analysis section 238. The output device 140 includes an image storing section 244, an image capturing time storing section 248, a ranking calculating section 250, output controlling section 254, and output section 256.

The image capturing section 202 captures an image. The image storing section 204 stores the image captured by the image capturing section 202. The image storing section 204 stores the image captured by the image capturing section 202 as relating to the image identification used for distinguish each image among the plurality of images.

The image capturing time measuring section 206 measures the time required for capturing the image by the image capturing section 202 in each image capturing operation of the image capturing section 202. The image capturing time measuring section 206 measures the time required for capturing the image from setting the image capturing section 202 ready to capture the image of an object to making the image capturing section 202 finish capturing the image of the object. More specifically, the image capturing time measuring section 206 starts to count when the image capturing section 202 is set to be ready to capture the image of the object, and keeps to count while the image capturing section 202 is operated to capture the image of the object by the user 180 to calculate the time required for capturing the image. The time measured by the image capturing time measuring section 206 includes the time for focus adjustment, shutter speed adjustment, and other preparation for capturing the image of the object, if these adjustments or preparations are done within a predetermined time interval. The image capturing time measured by the image capturing time measuring section 206 may also include the time from setting the image capturing section 202 ready to capture the image of the object until the operation controlling section 222 detects the user 180 releases the shutter button. The image capturing time may be the information which indicates the timing of setting the image capturing section 202 ready to capture the image and the timing of capturing the image.

The image capturing time storing section 208 stores the time measured by the image capturing time measuring section 206 as relating to each image storing section 204. The image capturing time storing section 208 stores the time measured by the image capturing time measuring section 206 as relating to the corresponding image ID.

The ranking calculating section 210 ranks the image based on the image capturing time measured by the image capturing time measuring section 206. The ranking calculating section 210 more highly ranks the image which the image capturing time measuring section 206 measures longer time for capturing. The ranking calculating section 210 more highly ranks the image stored in the image capturing time storing section and required longer time to be captured.

The ranking data storing section 212 stores the ranking data given by the ranking calculating section 210 as relating to the image captured by the image capturing section 202. The ranking data storing section 212 stores the ranking data given by the ranking calculating section 210 as relating to the corresponding image ID.

The image capturing time storing section 208 may store the time calculated by the image capturing time measuring section 206 and attach it as the tag information to the image stored in the image storing section 204. The ranking data storing section 212 may store the ranking data calculated by the ranking calculating section 210 and attaches it as the tag information to the image stored in the image storing section 204.

The image storing section 244 stores the image for the image captured by the image capturing apparatus 100. The image storing section 244 stores the data for the image and image ID received from the image storing section 204.

The image capturing time storing section 248 stores the time required to capture the image with the image capturing apparatus 100 as relating to each image stored in the image storing section 244. The image capturing time storing section 248 stores the image ID received from the image capturing time storing section 208 and the time required for capturing the image. The image capturing time storing section 248 may include the time required for capturing the image, which is extracted from the tag information of the image stored in the image storing section 244.

The ranking calculating section 250 ranks the image stored in the image storing section 244 based on the time required for capturing the image, which is stored in the image capturing time storing section 248. The ranking calculating section 250 more highly ranks the image stored in the image storing section 244, which is required longer time to be captured. The time required for capturing the image is stored in the image capturing time storing section 248.

The output controlling section 254 preferentially outputs the image more highly ranked by the ranking calculating section 250. The output controlling section 254 may preferentially output the image having higher ranking data stored in the ranking data storing section 212. The output controlling section 254 may also preferentially output the image having higher ranking data extracted from the tag information of the image stored in the image storing section 244. The output section 256 outputs plurality of the images under the instruction from the output controlling section 254. The output section 256 may be a display device such as a liquid crystal display device which displays an image, or a printing device which prints out and output an image.

The output controlling section 254 displays or prints out the image which has higher ranking data given by the ranking calculating section 250. When the output controlling section 254 displays or prints out several images in different regions on the output section 256, the more highly ranked image among the images output by the output section 256 may be displayed or printed out in the center of the screen and in larger size, or in the foreground. The output controlling section 254 may display or print out the more highly ranked image among the images output by output section 256 in upper position on the screen in larger seize. The output controlling section 254 may select the more highly ranked image to display or print out preferentially. The output controlling section 254 may preferentially select the more highly ranked image to display or print out distinctly with decorations such as a frame or special effects. The output controlling section 254 may preferentially select and trim the more highly ranked image to display or print out distinctly.

The output controlling section 254 may display longer the more highly ranked image. When the output controlling section 254 displays plurality of images one by one on the output section 256, the more highly ranked image may be displayed longer. When the output controlling section 254 displays plurality of images one by one on the output section 256, the more highly ranked image may be displayed preferentially.

The auxiliary image capturing section 226 obtains plurality of auxiliary images which are captured at the timing before the image captured by the image capturing section 202. The auxiliary images may, for example, be captured after the image capturing section 202 is ready to capture and before the image capturing section 202 captures the image by the instruction of the user 180. The image capturing apparatus 100 displays such plurality of auxiliary images on a display device such as a monitor to allow the user 180, for example, to define a captured area, decide a focused object, adjust exposure before capturing the image.

The composition change amount detecting section 224 detects how much the composition changes between the plurality of the auxiliary images obtained by the auxiliary image capturing section 226. For example, the composition change amount detecting section 224 calculate the identical area in sequential auxiliary images obtained by the auxiliary image capturing section 226. The operation controlling section 222 then judge whether the user 180 operates the image capturing section 202 to capture the image of an object based on the amount of change in composition detected by the composition change amount detecting section 224. When the area detected by the composition change amount detecting section 224 is smaller than predetermined, the operation controlling section 222 decides no image capturing operation by the user 180.

The identical area extracting section 230 finds out the identical area in the sequential auxiliary images obtained by the auxiliary image capturing section 226. The composition change amount detecting section 224 calculates the identical area in the sequential auxiliary images obtained by the auxiliary image capturing section 226, which is detected by the identical area extracting section 230. The composition change amount detecting section 224 detects the ratio of the difference between the said identical area and the area of the auxiliary image to the area of the auxiliary image and defines the ratio as the amount of change in composition. The object extracting section 232 extracts each object included in the auxiliary images obtained by the auxiliary image capturing section 226. The composition change amount detecting section 224 counts the number of the identical objects extracted from the auxiliary images by the object extracting section 232, and calculate the amount of change in composition based on the number of such objects. The Brightness histogram detecting section 234 makes brightness histograms from the plurality of auxiliary images obtained by the auxiliary image capturing section 226. The composition change amount detecting section 224 may calculate the amount of change in composition based on the amount of change in the brightness histograms of the plurality of auxiliary images made by the Brightness histogram detecting section 234. The color histogram detecting section 236 makes color histograms from the plurality of auxiliary images obtained by the auxiliary image capturing section 226. The composition change amount detecting section 224 may calculate the amount of change in composition based on the amount of change in the color histograms of the plurality of auxiliary images made by the color histogram detecting section 236. The texture analysis section 238 analyses textures from the plurality of the auxiliary images obtained by the auxiliary image capturing section 226. The composition change amount detecting section 224 may calculate the amount of change in composition based on the amount of change in the texture of the plurality of auxiliary images made by the texture analysis section 238.

When the operation controlling section 222 decides the user 180 doesn't do image capturing operation after the image capturing section 202 is set to be ready to capture the image of the object and until the image capturing section 202 captures the image of the object, the image capturing time measuring section 206 measure the time since the operation controlling section 222 decides no image capturing operation by the user 180 and until the image capturing section 202 captures the image to define it as the time required for capturing the image. The user 180 may keep the image capturing apparatus 100 on and dangle it from the neck for a while. If the image capturing time measuring section 206 adds such time to calculate, the time required for capturing the image includes the time in which the user 180 doesn't intend to capture the image. In such case, if the image capturing apparatus 100 detects the substantial change in composition between the auxiliary images, it decides the user 180 doesn't intend to capture the image and doesn't include the time in the image capturing time. The image capturing apparatus 100 can calculate the appropriate time required for capturing the image.

The criteria storing section 228 stores the criteria which relate to the types of change showing how the composition change and the amount of change in composition and are provided to judge the user 180 doesn't operate to capture the image. The composition change amount detecting section 224 calculates the amount of change in composition between the plurality of auxiliary images obtained by the auxiliary image capturing section 226 as checking and identifying each type of change stored in the criteria storing section 228. When the criteria stored in the criteria storing section 228 applies to the type and amount of change in composition detected by composition change amount detecting section 224, the operation controlling section 222 decides that the user 180 doesn't operate the image capturing section 202 to capture the image.

The criteria storing section 228 stores the reference value. As to the identical area the reference value is, for example, 70%. If the identical area is smaller than the reference value, the operation controlling section 222 decide no image capturing operation by the user 180. As described above, the operation controlling section 222 can judge whether the user 180 intend to operate the image capturing section 202 to capture the image of the object based on the amount of change in composition detected by composition change amount detecting section 224. The image capturing apparatus 100 can appropriately define the time in which the user 180 intend to capture the image as the time required for capturing the image by defining.

The above image output system 190 can provide the album automatically arranging the images which the user 180 adjusts some photographic parameters and waits the right moment to capture in the cover or in the center of a page and in large size. The user 180, therefore, can easily get the album in which the favorite images are arranged as main features.

Figure 3:
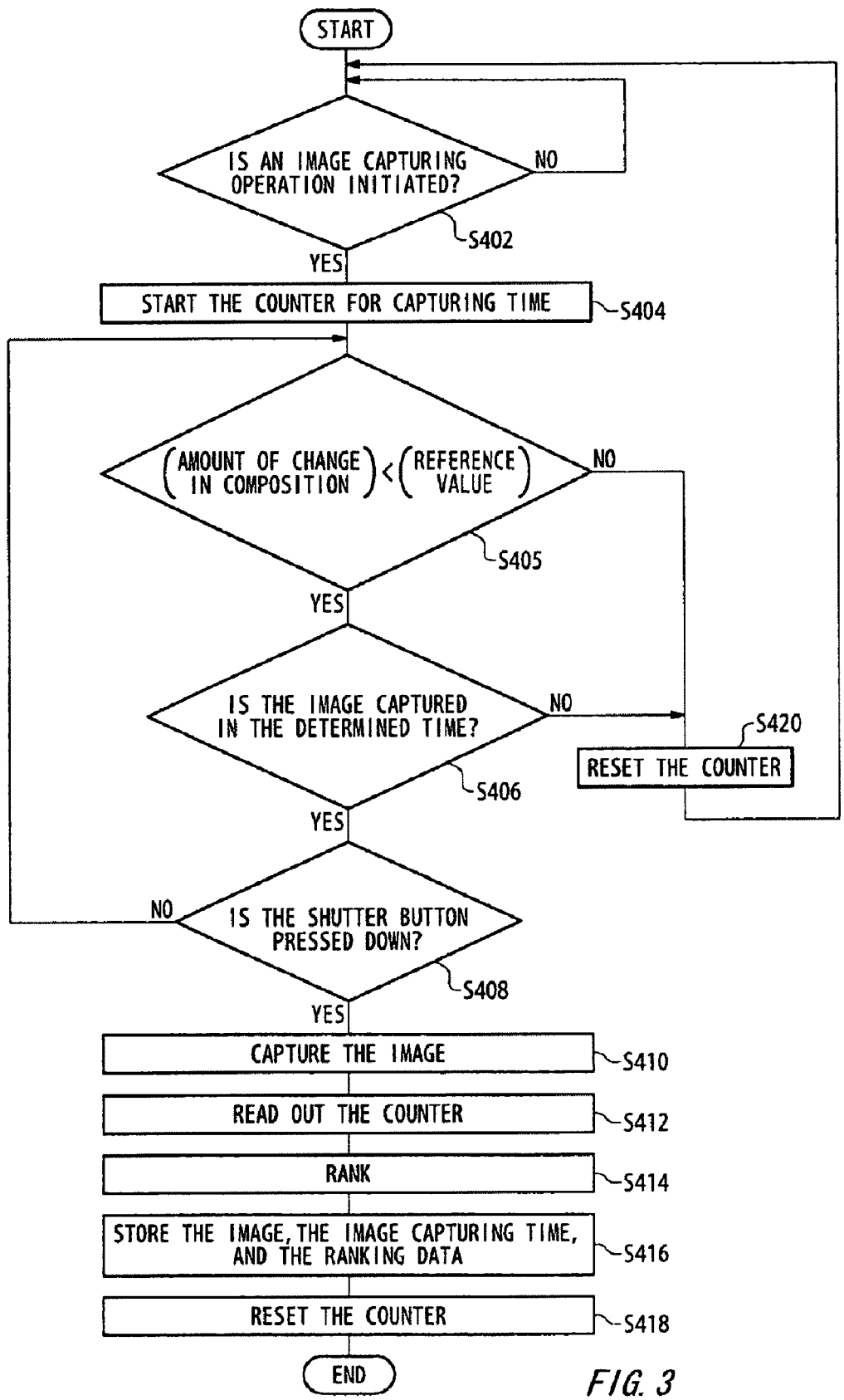
FIG. 3 is a flow chart showing the process of calculating the time required to capture an image.

FIG. 3 is the flow chart of calculating the time required for capturing the image. The image capturing apparatus 100 decides whether the user 180 operate to capture the image (S402). Image capturing operation by the user 180 may includes adjusting some photographic parameters such as speed and focus, pressing down the shutter button, turning on the switch, or other operation relating to movement for capturing the image with the image capturing apparatus 100.

At the stage of S402, if the image capturing apparatus 100 decides the user 180 operate to capture the image (S402: YES), the image capturing time measuring section 206 make a counter start to count the time required for capturing the image. The operation controlling section 222 judges whether the amount of change in composition in auxiliary images is smaller than the reference value (S405). At the stage of S405, if the operation controlling section 222 judges the amount of change in composition in auxiliary images is smaller than the reference value (S405: YES), the image capturing apparatus 100 judges whether the image capturing operation is done in the predetermined time period after the previous image capturing operation or after the counter starting to count (S406). At the stage of 406, if the image capturing operation is done in the predetermined time period (S406: YES), the image capturing apparatus 100 judges whether the shutter button is pressed (S408).

At the stage of 408, if the shutter button is pressed (S408: YES), the image capturing section 202 captures the image (S410). The image capturing time measuring section 206 reads the value displayed in the counter to define the time required for capturing the image at the stage of S410 (S412). The ranking calculating section 210 then ranks the image based on the image capturing time defined at the stage of S412. The image storing section 204, the image capturing time storing section 208, and the ranking data storing section 212 store the image captured at the stage of S410, the image capturing time defined at the stage of 412, and the ranking data given at the stage of 414 respectively (S416) The image capturing time measuring section 206 resets the counter to display zero (S418), the image capturing apparatus 100 finishes the operation.

At the stage of S402, if the user doesn't operate to capture the image (S402: NO), the image capturing apparatus 10 repeats the S402 procedure. At the stage of S405, if the operation controlling section 222 decides the amount of change in composition is larger than the reference value (S405: NO), or at the stage of S406, if there is no image capturing operation in the predetermined time period, the image capturing time measuring section 206 resets the counter to display zero (S420), the procedure is returned to the stage of S402.

As described above, the image capturing time measuring section 206 always resets if there is no image capturing operation in the predetermined time period, if the user 180 presses down the shutter button after long interval without image capturing operation, the idle period in which the user 180 doesn't operate to capture the image isn't included in the image capturing time. When the user 180 to adjust some photographic parameters carefully and thoroughly, the image capturing time measuring section 206 can includes the adjusting time in the image capturing time. The image capturing time measuring section 206 makes the counter continue to count the image capturing time if the amount of change in composition in the auxiliary images is smaller than the reference value. The image capturing time measuring section 206 can appropriately measure the image capturing time after the user 180 determines the composition of objects to set in the captured area of the image capturing apparatus 100 and until the shutter button is pressed down. The image capturing time measuring section 206, therefore, appropriately measure the image capturing time in which the user 180 continuously operates the image capturing section 202 to capture the image of the object.

FIG. 4 is a part of the table showing the parameters stored in the criteria storing section 228. The criteria storing section 228 stores the reference values used for judging whether the user 180 operates to capture the image. The reference value is 30% when the image area is treated the type of change. When the number of the object is treated as the type of change, the criteria storing section 228 also stores the amount of change in object number of 33% as a reference value used for judging whether the user 180 operate to capture the image. When the brightness histogram is treated as the type of change, the criteria storing section 228 also stores the amount of change in brightness histogram of 20% as a reference value used for judging whether the user 180 operate to capture the image. When the color histogram is the type of change, the criteria storing section 228 also stores the amount of change in color histogram of 20% as a reference value used for judging whether the user 180 operate to capture the image. When the texture is a type of change, the criteria storing section 228 also stores the amount of change in texture of 25% as a reference value used for judging whether the user 180 operate to capture the image. The amount of change in texture may be calculated based on the changes in camera angle or edge amount. The amount of changes in brightness and color histograms is described below with examples. In the above description, the criteria storing section 228 stores criteria relating the type of change and the amount of change, for example. The criteria storing section 228 also stores other criteria as well as the amount of change. For example, when the texture is treated as the type of change, the criteria storing section 228 can store the criteria relating to the change in texture used for judgment whether the user 180 operate to capture the image.

Figure 5:
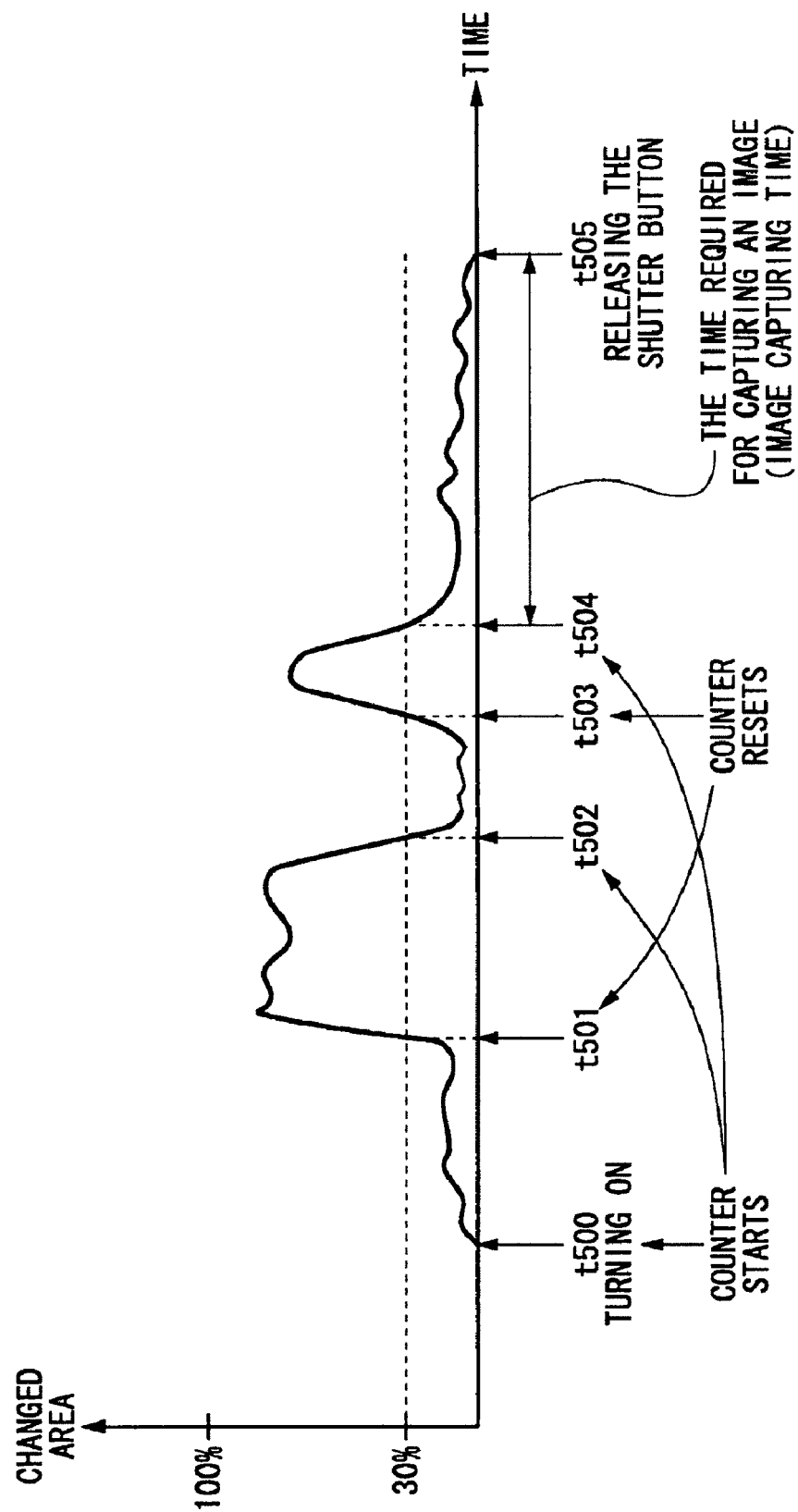
FIG. 5 shows how the counter operates when the operation controlling section 222 calculates the time required for image capturing based on the changed area.

FIG. 5 shows the performance of the counter calculating the time required for capturing the image based on the image area changing between sequential auxiliary images, hereinafter the changing image area.

At the time of t500, the user 180 turns on the image capturing apparatus 100 and the counter starts to count. The counter resets at the timing at which the changing image area detected by composition change amount detecting section 224 becomes 300 or more of the whole area of the auxiliary image, for example at the points of t501 and t503. The counter restarts at the timing at which the changing image area detected by composition change amount detecting section 224 becomes under the 30% of the whole area of the auxiliary image, for example at the points of 502 and t504. If the shutter button of the image capturing apparatus is pressed down by the user 180 at the point of t505 the image capturing time measuring section 206 calculates the image capturing time from the time of restarting the counter at the point of t504 to the point of t505.

Now described is how the composition change amount detecting section 224 works when calculating the changing image area in two sequential auxiliary images. The identical area extracting section 230 calculates the amount of difference, or the density of the amount of difference, in the target area A for calculating the amount of change in composition in the auxiliary images based on the difference signals detected when the auxiliary images are overlapped and relatively slid away in various manners. The identical area extracting section 230 calculates, for example, the difference signals per pixel at the point where the amount of difference is the smallest in the target area A, and detects the pixels which have the difference signals which are smaller than the reference value. The region detected by the identical area extracting section 230 consists of such pixels. The composition change amount detecting section 224 calculates the rest pixels without the pixels detected by the identical area extracting section 230 to define the index of the area of the changed image region. The composition change amount detecting section 224 may, off course, sum up the all areas of the pixels detected by the identical area extracting section 230 to define the area of the changed image region. If the value calculated by dividing the area of the changed image region by the whole area the operation controlling section 222, or the sum of the identical areas in the auxiliary images is below the reference value of 30% stored in the criteria storing section 228, the operation controlling section 222 decides the user 180 continues image capturing operation, and makes the counter keep on counting. If the value is the reference value of 30% or more, the operation controlling section 222 decides the user doesn't operate to capture the image, and resets the counter.

The following is described how the composition change amount detecting section 224 operates when it counts the number of the objects which are changed between the two sequential auxiliary images. The object extracting section 232 extracts the outlines of the objects from the target area A in the auxiliary images by, for example, an edge extraction method. The composition change amount detecting section 224 calculates how much the outlines of the objects extracted from both auxiliary images by the object extracting section 232 match each other by a pattern matching method. The composition change amount detecting section 224 calculates the number of the objects which has smaller identical area than the predetermined. The number of the objects is divided by whole number of the objects contained in the auxiliary images, or the average of the number of the objects contained in the plurality of the auxiliary images. When the resulted value is below the reference value of 33% stored in the criteria storing section 228, the operation controlling section 222 decides the user 180 operates to capture the image, and makes the counter keep on counting. When the resulted value is 33% or more, the operation controlling section 222 decides the user 180 doesn't operate to capture the image, and resets the counter.

The following is described that the composition change amount detecting section 224 detects the amount of change in brightness histogram in the two sequential auxiliary images and defines it as the amount of change in composition. The composition change amount detecting section 224 picks up the plurality of pixels in the target area A where the amount of the change in composition is calculated, and detects the brightness $V_{ai}$ of the pixel i in the first auxiliary image and the brightness $V_{bi}$ of the pixel i in the second auxiliary image. Here, subscript "i" stands for one or more certain pixels. The composition change amount detecting section 224 divides the smaller brightness value between $V_{ai}$ and $V_{bi}$ is divided by the other larger one to calculate the value $f_{vi}$ for each pixel. The composition change amount detecting section 224 divides the sum of the $f_{vi}$ values of the pixels i in the target area A where the amount of change in the brightness histogram is calculated by the number of the pixels included in the target area A, and defines the resulted value as the identical level F of the brightness histogram of the first and second auxiliary images. The composition change amount detecting section 224, for example, subtracts F from 1 (1−F) to calculate the amount of change in brightness histogram. The composition change amount detecting section 224, therefore, can adequately calculate the amount of change in composition including the change in appearance of the object between the auxiliary images.

The composition change amount detecting section 224 may also calculate the amount of change in appearance of the brightness histogram. The Brightness histogram detecting section 234 detects the brightness and the number of the pixels in the target area A of the first and second auxiliary images respectively and makes the first and second histograms with the brightness and the number of the pixels for horizontal and vertical axes respectively. The composition change amount detecting section 224 calculates the area which isn't identical in the two brightness histograms. The composition change amount detecting section 224 finds and calculates the minimum area which isn't identical in the two brightness histograms by sliding the second brightness histogram laterally to maximize the identical area in the two brightness histograms. The composition change amount detecting section 224 divides the minimum area by the area of the first brightness histogram to define the amount of change in brightness histogram. When the appearances of the first and second brightness histograms are identical, the composition change amount detecting section 224, therefore, doesn't detect the amount of the change in brightness histogram. Detecting the appearance change in brightness histograms can prevent from wrongly detecting a larger amount of change in composition when the user 180 only changes aperture size.

The following is described that the composition change amount detecting section 224 detects the amount of change in color histograms in the two sequential auxiliary images and defined it as the amount of change in composition. The color histogram detecting section 236 divides each axis of the RGB space into Q to make the color histogram with axes of typical colors of $Q^3$ from the target area A. When the numbers of pixels corresponding to a color j calculated from each target area A in the first and second auxiliary images are defined as $H_i$ and $M_j$ respectively, the composition change amount detecting section 224 provides the smaller number of pixels $g_j$ between $H_j$ and $M_j$. The composition change amount detecting section 224 divides the sum of the number of the pixels $g_j$ relating to the color j by the number of the pixels included in the target area A to define the resulted value as the matching level of color histogram. The composition change amount detecting section 224, for example, subtracts G from 1 (1−G) to define the resulted value as the amount of change in color histogram. The color histogram tends not to be affected by the change in color of the object. This can prevent from wrongly detecting a larger amount of change in composition if the appearance of the object is changed in the auxiliary images because, for example, the object moves.

As described above, the composition change amount detecting section 224 calculates the amount of change in brightness histogram by detecting the change in appearance of the brightness histogram. This can be applied to color histogram, too. The composition change amount detecting section 224 can calculate the amount of change in color histogram by detecting the change in appearance of color histogram. The composition change amount detecting section 224 may define the maximum value or the average value in each histogram of red, blue and green as the amount of change in color histogram.

The following is described how the composition change amount detecting section 224 detects the amount of change in texture in the two sequential auxiliary images to define it as the amount of change in composition. The texture analysis section 238 calculates the correlativeness and edge amount in the target area A of the first and second auxiliary images. The composition change amount detecting section 224 calculates the amount of change in texture based on the correlativeness and the edge amount calculated by the texture analysis section 238. For example, when the normalized correlation value in the target area A of the first and second auxiliary images is expressed by R, the texture analysis section 238 subtracts R from 1 (1−R) to define the resulted value as the amount of change in texture. The texture analysis section 238 also may detect the texture types of the target area A in the first and second auxiliary images. The texture analysis section 238 may decide a directional property of texture by the edge extracted in target area A. The texture analysis section 238 stores the information about plurality of texture types relating to the vector quantities of edge. The texture analysis section 238, therefore, selects the texture type which matches each vector quantity of the edge extracted from the target area A among the texture types stored therein. The composition change amount detecting section 224 may detect the change in texture type which is detected by the texture analysis section 238 from the target area A of the first and second auxiliary images.

In those ways the Brightness histogram detecting section 234, the color histogram detecting section 236, and the texture analysis section 238 detect the brightness histogram, the color histogram, and the texture and related parameters such as texture type respectively. The above described target area A may consist of the pixels sampled from the auxiliary images based on the predetermined density and distribution. The Brightness histogram detecting section 234, the color histogram detecting section 236, and the texture analysis section 238 detect each parameter from the sampling data which is obtained by sampling the pixels included in the image in the predetermined density and distribution. It is preferable that the Brightness histogram detecting section 234, the color histogram detecting section 236, and the texture analysis section 238 detect each parameter by sampling the target area A with the frequency which is lower than the predetermined. When the user 180 continues to adjust focus and the image capturing section 202 captures the auxiliary images of the same object, the amount of change in composition using with the parameter obtained by sampling with higher frequency tends to be larger than using with the parameter obtained by sampling with lower frequency. The Brightness histogram detecting section 234, the color histogram detecting section 236 and the texture analysis section 238 detect each parameter by sampling with the frequency which is lower than predetermined so that the amount of change in composition can prevent from being unintendedly detected in large during focus adjustment by the user 180. The image capturing time measuring section 206 can appropriately include the time required for adjusting focus by the user 180 in the image capturing time.

The identical area extracting section 230, the object extracting section 232, the Brightness histogram detecting section 234, the color histogram detecting section 236, and the texture analysis section 238 may define the target area A from the identical region of the first and second auxiliary images based on the zoom value at which the image is captured by the image capturing section 202 If the zoom value C.sub.2 at which the second auxiliary image is captured is larger than the zoom value C.sub.1 at which the first auxiliary image is captured, the identical area extracting section 230, the object extracting section 232, the Brightness histogram detecting section 234, the color histogram detecting section 236, and the texture analysis section 238 specify the target region which is commonly captured in the first and the second auxiliary images based on the zoom values C.sub.1 and C.sub.2. The 30, the object extracting section 232, the Brightness histogram detecting section 234, the color histogram detecting section 236, and the texture analysis section 238 make the target region in the second auxiliary image small to the size to be captured with the zoom value C.sub.1 on the basis of the zoom values C.sub.1 and C.sub.2. The 30, the object extracting section 232, the Brightness histogram detecting section 234, the color histogram detecting section 236, and the texture analysis section 238 detect the identical region, the object, the brightness histogram, the color histogram, and the texture respectively from the diminished target region and the first auxiliary image. In such way, the composition change amount detecting section 224 can appropriately detect the amount of change in composition by compensating the change in image size resulted from the zooming operation by the user 180. The image capturing time measuring section 206 can appropriately include the zooming operation by the user 180 who want to capture the image with best framing in the image capturing time.

The criteria storing section 228 can also store various parameters as well as the changed image area, the changed number of objects, the changed brightness histogram, the changed color histogram, and the changed texture type. The operation controlling section 222 can appropriately judge whether the user 180 keep to capture the image or not by comparing the plurality of the auxiliary images. As described above, whether the user 180 operates to capture the image is judged by the operation controlling section 222 based on the changed the image area. In other words, the operation controlling section 222 can decide whether the user 180 operates to capture the image by detecting the area of identical region.

According to the image output system 190, the album which is automatically arranged the images captured carefully and thoroughly by the user 180 with adjusting parameters in the cover or in the center of page in larger size is provided to the user 180. The user 180, therefore, can easily get the album in which the favorite images are laid out in prime places. The user 180, therefore, can enjoy seeing the album.

Figure 6:
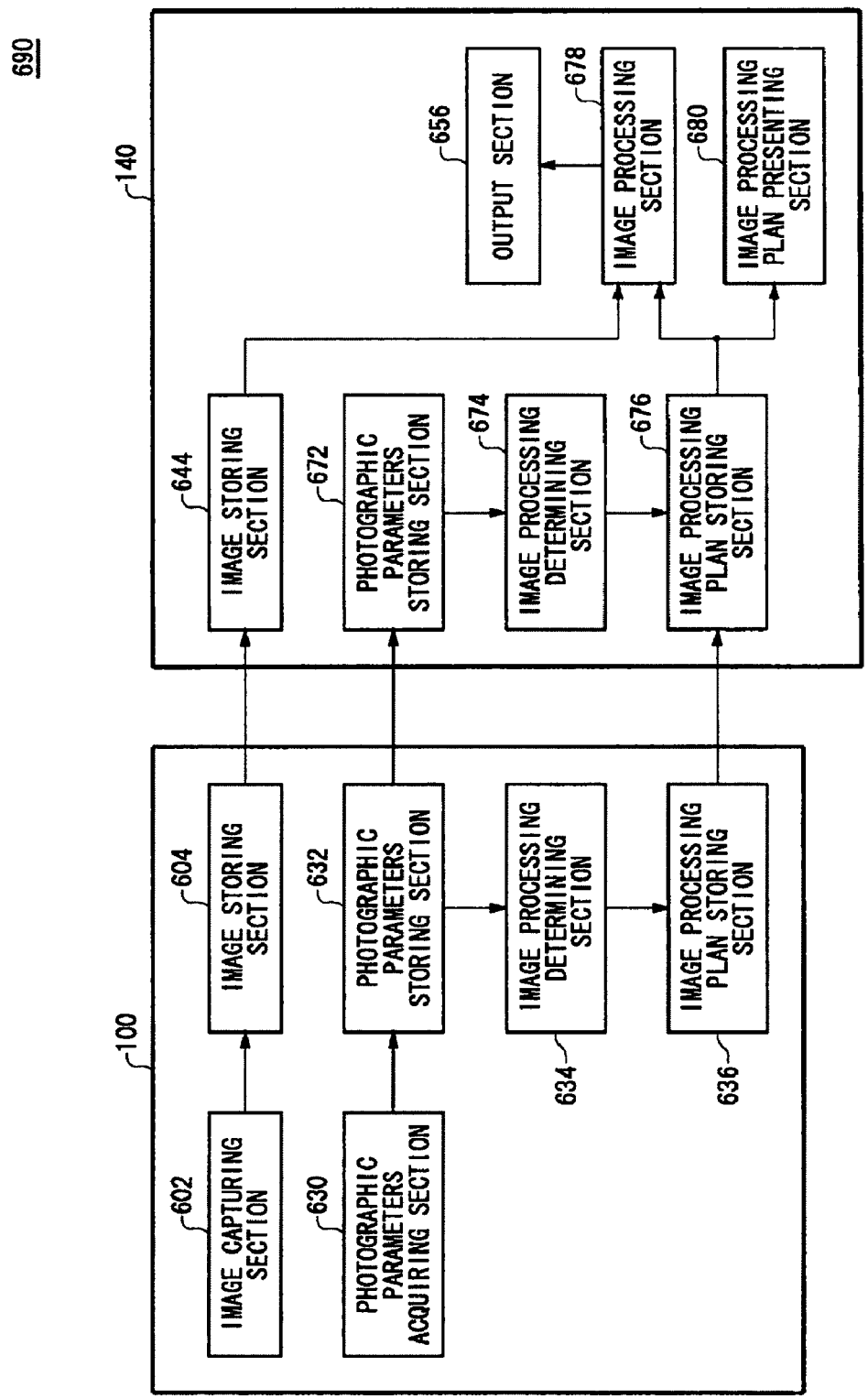
FIG. 6 is a block diagram showing the structure of the image output system 690 of the second embodiment.

FIG. 6 is a block diagram showing the image output system 690 of the second embodiment. The image output system 690 has the purpose of providing an image output system which records the operation to adjust parameters by the user 180, and plans to process the image to be output based on the parameter recorded. The image output system 690 includes an image capturing apparatus 600 and an output device 640. The image capturing apparatus 600 includes an image capturing section 602, the image storing section 604, the photographic parameters acquiring section 630, the photographic parameters storing section 632, the image processing determining section 634, and the image processing plan storing section 636. The output device 640 includes, the image storing section 644, the photographic parameters storing section 672, the image processing determining section 674, the image processing plan storing section 676, the image processing section 678, the image processing plan presenting section 680, and an output section 656. The image output system 690 can incorporate the functions incorporated in the output system 190 of the first embodiment. For example, the image output system 690 can record the photographic parameters operated during the image capturing time is counted by the image output system 190. The image output system 690 can decide how the output image is made distinctive based on the amount of operation of photographic parameters recorded.

The image capturing section 602 captures an image. The image storing section 604 stores the image captured by the image capturing section 602.

The photographic parameters acquiring section 630 obtains the data of how the photographic parameters are changed by the operations of the user 180 until capturing the image as relating to the image captured by the image capturing section 602. The photographic parameters acquiring section 630 obtains the parameters changed by the user after setting the image capturing section 602 ready for capturing an image of an object to finishing to capture it.

The photographic parameters storing section 632 stores the data of how the graphic parameters are changed by the operations of the user while the image capturing apparatus 600 captures the image as relating to the image stored in the image storing section 604. The photographic parameters storing section 632 stores the data of the change in photographic parameters obtained by the photographic parameters acquiring section 630 as relating to the image captured by the image capturing section 602.

The image processing determining section 634 defines the allowable range for processing the image to be output which is captured by the image capturing section 602 based on the change in photographic parameters obtained by photographic parameters acquiring section 630. The image processing plan storing section 636 stores the data of the allowable range for image processing defined by the image processing determining section 674 relating the image captured by the image capturing section 602.

The photographic parameters acquiring section 630 obtains the data of the field angle and the change in field angle while the image capturing section 602 captures the image by the operations of the user 180 as relating to the image captured by the image capturing section 602. The image processing determining section 634 defines the allowable range for trimming the image to be output which is captured by the image capturing section 602 based on the data of the field angle and the change in field angle obtained by the photographic parameters acquiring section 630. The photographic parameters acquiring section 630 stores the data of the allowable range for trimming defined by the image processing determining section 674 as relating to the image captured by the image capturing section 602.

The image storing section 644 stores the image captured by the image capturing apparatus 600. The image storing section 644 receives the image stored in the image storing section 604. The photographic parameters storing section 672 stores the data of the change in photographic parameters while the image capturing apparatus 600 captures the image by the operations of the user 180 as relating the image stored in the image storing section 604. The photographic parameters storing section 672 stores the data of the change in the parameters stored in the photographic parameters storing section 632 and related to the images.

The image processing determining section 674 defines the allowable range for processing the image to be output which is stored in the image storing section 644 based on the data of the change in parameters stored in the photographic parameters storing section 632.

The image processing determining section 674 defines the allowable range for trimming similarly to the image processing determining section 634. The image processing plan storing section 676 stores the data of the allowable range for image processing defined by the image processing determining section 674 as relating to the image stored in the image storing section 644. The image processing plan storing section 676 may receive the data of the allowable range for image processing which is stored in the image processing plan storing section 636 and store it.

The image processing plan presenting section 680 displays the allowable range of the image processing defined by the image processing determining section 674 to the user 180. The image processing plan presenting section 680 displays the data of the allowable range of image processing stored in the image processing plan storing section 676. For example, the image processing plan presenting section 680 displays the allowable range of trimming defined by the image processing determining section 674 to the user 180. Especially, the image processing plan presenting section 680 displays and shows the allowable range of trimming to the user 180 by framing the area to be trimmed on the image to indicate the allowable range defined by the image processing determining section 674.

The image processing section 678 processes the image captured by the image capturing section 602 in the allowable range defined by the image processing determining section 674. The image processing section 678 processes the image stored in the image storing section 644 in the allowable range defined by the image processing determining section 674. The output section 656 outputs the image processed by the image processing section 678.

The image storing section 604 and image storing section 644 may be a hard disc, a semiconductor memory device, a CD-ROM, or other storage media, or a volatile memory which temporarily stores the image read from another storage media or CCD. The photographic parameters storing section 632 may store the photographic parameters as the tag data of the image stored in the image storing section 604. The image processing plan storing section 636 may store the data how to process the image as the tag data of the image stored in the image storing section 604. The photographic parameters storing section 672 may store the parameters as the tag data of the image stored in the image storing section 644, and the image processing plan storing section 676 may store the data how to process the image as the tag data of the image stored in the image storing section 644.

As described above, the image output system 690 defines the allowable range for image processing when the image captured by the image capturing section 602 is output based on the changes in photographic parameters obtained by the photographic parameters acquiring section 630. The image output system 690 can prevent from processing the image in the manner which the user 180 doesn't intend to be output. The image output system 690 can control to avoid trimming one person's image out of a group photo captured by the user 180 with a wide angle for the purpose of taking the group photo.

Figure 7:
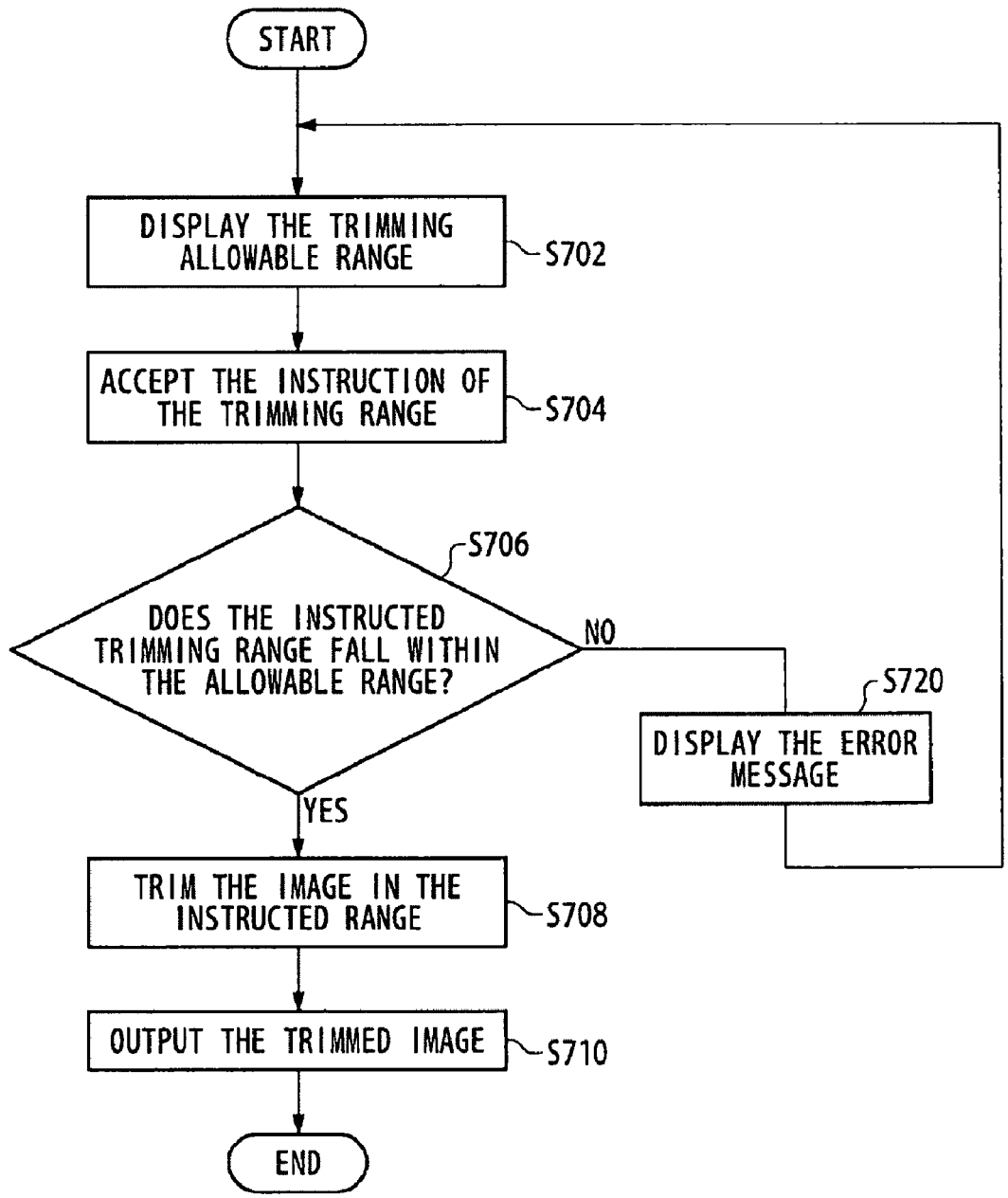
FIG. 7 is a flow chart showing the process of image processing of the output device 640 according to the instruction of the user 180.

FIG. 7 is a flow chart when the output device 640 processes the image by order of the user 180. The output device 640 displays the allowable range for trimming stored in the image processing plan storing section 676 (S702). The output device 640 accepts the instruction teaching the trimming range input of the user 180 The output device 640 evaluates whether the instructed range falls within the allowable range (S706). At the stage of S706, if the instructed range falls within the allowable range the image processing section 678 trims the image within the instructed range to output. The output section 656 outputs the image trimmed by the image processing section 678 to be arranged in such as an album.

If the instructed range doesn't fall within the allowable range, the output device 640 displays the error message alerting that the instructed range isn't allowed and the process returns to the stage of S702. The output device 640 outputs the error message at the stage of S720 and may ask the user 180 if the image is trimmed as instructed and proceed the process to the stage of S708 if the instruction of trimming in the instructed range is input by the user.

FIG. 8 is a part of a table including the parameters for capturing the image and the corresponding allowable ranges which are used by the image processing determining section 674. The image processing determining section 674 stores the data that the image captured with the field angle $\alpha_1$ and the change in field angle $\alpha_2$ is allowed to be trimmed so that the trimmed image is no less than $\alpha_3\%$ of the original image. In such case, the image processing plan presenting section 680 displays the frame within which the image is trimmed and has the area of $\alpha_3\%$ of the original image. The image processing determining section 674 may store the length data indicating the allowable width and/or height of the trimmed image to teach the allowable range. This can prevent the image captured with a wide angle by the user from unintendedly trimming in smaller range.

For another parameter except for captured area, the image processing determining section 674 also stores the data that if the image captured with the aperture value $\beta_1$ and the change in aperture $\beta_2$ is allowed to be compensated with the compensation value of $\beta_3\%$ or less to increase the brightness. The image processing plan presenting section 680 can display the upper limit of the compensation near the menu list including the brightness compensation of the image processing software, or disturb compensating operation by the user 180 not to input the compensation value over the upper point of the compensation value. This can prevent the output device 640 from compensating the image captured with a big aperture by the user 180 to unintendedly increase the brightness.

The image processing determining section 634 may have the table including the parameters and the corresponding allowable ranges similarly to the image processing determining section 674. The image processing determining section 634 can also define the allowable range for image processing in the same way described about the image processing determining section 674.

As described above, the image captured with a wide angle, for example, to take a group photo can prevent from being trimmed more largely than intended. The image output system 690 can avoid to unintendedly trimming the image in large to make the output image obscure. The image output system 690 can easily display the allowable range which reflects the intension on capturing the image to the user 180.

Figure 9:
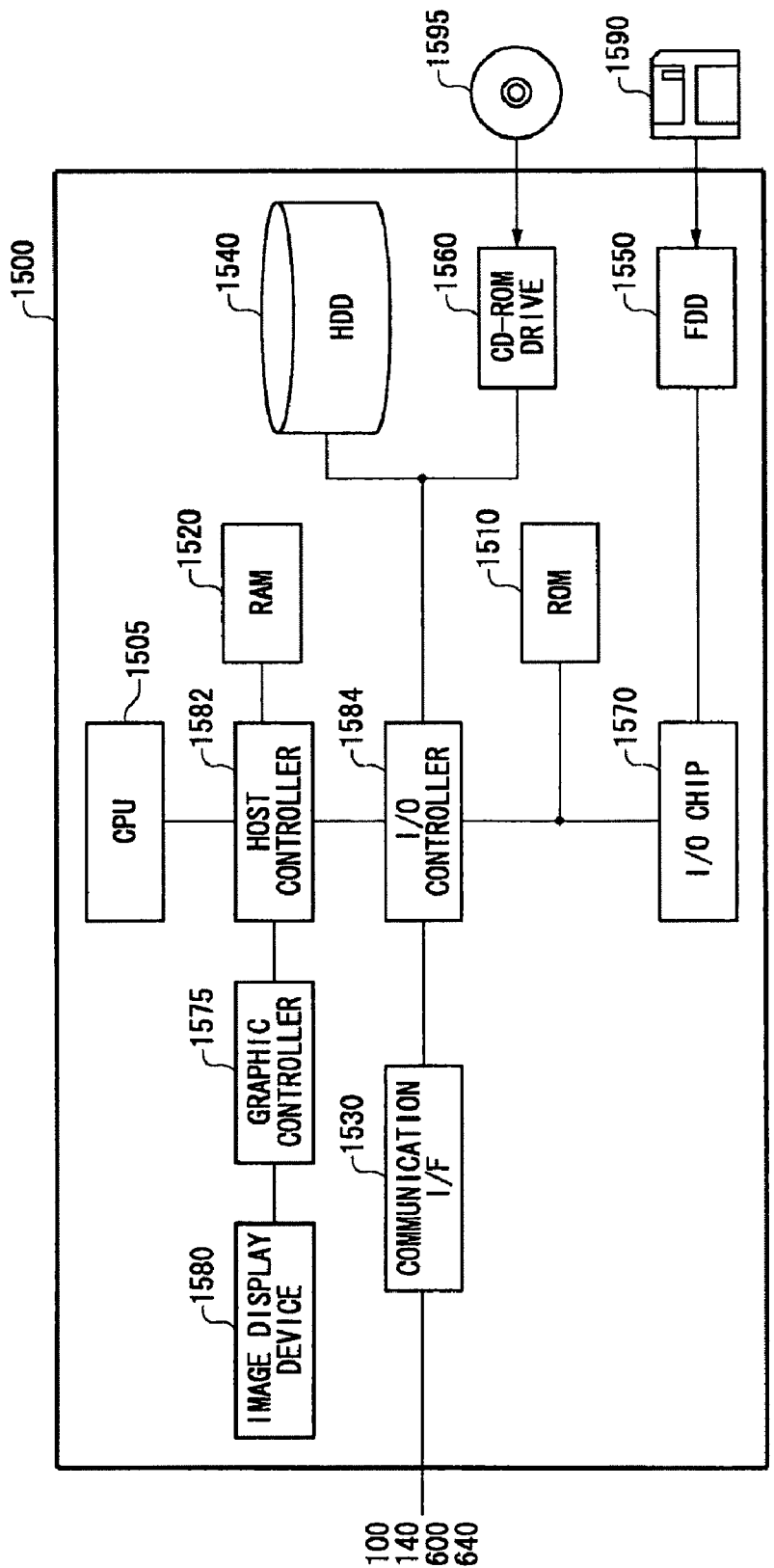
FIG. 9 is a block diagram showing the structure of the hardware components relating to the image capturing apparatus 100, the output device 140, the image capturing apparatus 600, and the output device 640.

FIG. 9 is a diagram showing a configuration of hardware components of a computer 1500 relating to the image capturing apparatus 100, the output device 140, the image capturing apparatus 600 and the output device 640. The computer 1500 includes; a CPU 1505 a RAM 1520, a graphic controller 1575, each of which is connected mutually with a host controller 1582, and a display device 1580, each of which is placed around the CPU; an input/output section comprising a communication interface 1530, a hard disc drive 1540, and a CD-ROM drive 1560, both of which are connected to the host controller 1582 via the input/output controller 1584; and a legacy input/output section comprising a ROM 1510, a flexible disc drive 1550, and an input/output chip 1570, all of which are connected to the input/output controller 1584.

The host controller 1582 connects the RAM 1520, the CPU 1505 making the RAM 1520 access at a high transfer rate, and the graphic controller 1575. The CPU 1505 controls each component in accordance with the program stored in the ROM 1510 and the RAM 1520. The graphic controller 1575 obtains the image created in the frame buffer made in the RAM by, for example, the CPU 1505 and displays the image on the display device 1580. Alternately, the graphic controller 1575 may include a frame buffer to store the image created by, for example, the CPU 1505.

The input/output controller 1584 connects the host controller 1582, the hard disc drive 1540 which operates relatively fast, the communication interface 1530, and the CD-ROM drive 1560. The hard disc drive 1540 stores the program and data used for the CPU 1505 in the computer 1500. The communication interface 1530 communicates with and provides the program and data through the network to the image capturing apparatus 100 and the output device 140. The CD-ROM drive 1560 reads out the program and data from the CD-ROM 1595, and provides them to the hard disc drive 1540 and the communication interface 1530 via the RAM.

The input/output controller 1584 connects the ROM 1510, the flexible disc drive 1550, and the input/output chip 1570, each of which operates relatively slowly. The ROM 1510 stores the boot program used when the computer 1500 boots up, and the program depending on the hardware components of the computer 1500. The flexible disc drive 1550 reads out the program or the data from the flexible disc 1590, and provides it to the hard disc drive 1540 and the communication interface 1530 via the RAM 1520. The input/output chip 1570 connects the flexible disc drive 1550 and various input/output devices via such as a parallel port, a serial port, a keyboard port, or a mouse port.

The program provided to the communication interface 1530 via the RAM is stored in the flexible disc 1590, the CD-ROM 1595, IC card, or other storage media to be provided by users. The program is read out from the storage media, provided to the communication interface 1530 via the RAM 1520, and sent to the image capturing apparatus 100 or the output device 140 via the network. The program sent to the image capturing apparatus 100 and the output device 140 is installed in the image capturing apparatus 100 or the output device 140 to be implemented.

The program installed and implemented in the image capturing apparatus 100 runs to function the image capturing section image capturing section 202, the image storing section 204, the image capturing time measuring section 206, the image capturing time storing section 208, the ranking calculating section 210, the ranking data storing section 212, the operation controlling section 222, the composition change amount detecting section 224, the auxiliary image capturing section 226, the criteria storing section 228, the identical area extracting section 230, the object extracting section 232, the Brightness histogram detecting section 234, the color histogram detecting section 236, and the texture analysis section 238, all of which are included in the image capturing apparatus 100 and described with FIGS. 1-3. The program installed and implemented in the output device 140 runs to function the image storing section 244, the image capturing time storing section 248, the ranking calculating section 250, the output controlling section 254, and the output section 256, all of which are included in the output device 140 and described with FIGS. 1 and 2. The program installed and implemented in the image capturing apparatus 600 runs to function the image capturing section 602, the image storing section 604, the photographic parameters acquiring section 630, the photographic parameters storing section 632, the image processing determining section 634, and the image processing plan storing section 636, all of which are included in the image capturing apparatus 600 and described with FIGS. 1 and 6-8. The program installed and implemented in the output device 640 runs to function the image storing section 644, the photographic parameters storing section 672, the image processing determining section 674, the image processing plan storing section 676, the image processing section 678, the image processing plan presenting section 680, and the output section 656, all of which are included in the output device 640 and described with FIGS. 1 and 6-8.

The programs described above may be stored in the externally connected storage media. Such storage media are, for example, DVDs, phase charge rewritable discs (PD), or other optical storage media, MDs, or other magneto-optical disks, tape media, IC cards, or other semiconductor memories. The program may also be stored in such a hard disc or a RAM incorporated in a server system connecting a special communication network or the internet to be provided the computer 1500 via such network.

The present invention is described above with the embodiments. The scope of the present invention, however, cannot be limited within the embodiments described above. The above embodiments can be modified or improved variously. Apparently from the scope of what is claimed, such modified or improved embodiments can be included in the scope of the present invention.

The invention claimed is:

1. An image output system, comprising:
    an image capturing section which captures an image;
    a photographic parameters acquiring section which acquires the change over time in photographic parameters changed by the user's operation while capturing the image by said image capturing section as relating to the image captured by said image capturing section;
    an image processing determining section which defines the allowable range of processing the image captured by said image capturing section to be output based on the change over time in photographic parameters acquired by said photographic parameters acquiring section; and
    an image processing plan presenting section which displays the allowable range of image processing defined by said image processing determining section to the user.

2. The image output system according to claim 1 which further includes:
    an image processing section which provides the image captured by said image capturing section with the image processing operation within the range allowed by said image processing controlling section; and an output section which outputs the image processed by said image processing section.

3. The image output system according to claim 1, wherein said photographic parameters acquiring section obtains the change in photographic parameters changed by the user after the image capturing section is ready to capture the image of the object and until it finishes capturing it.

4. The image output system according to claim 1, wherein said photographic parameters acquiring section obtains the filed angle and the amount of change in filed angle, which are resulted from the user's operation until said image capturing section captures the image as relating to the image captured by said image capturing section, wherein said image processing determining section defines the allowable range of trimming when the image captured by the image capturing section is trimmed and output based on the filed angle and the amount of change in field angle acquired by said photographic parameters acquiring section, and wherein said image processing plan presenting section displays the allowable trimming range defined by said image processing determining section to the user.

5. The image output system according to claim 1, further comprising an output section which displays, when a range of processing the image inputted by the user does not fall within the defined allowable range of processing the image, an error message alerting that the inputted range is not allowed.

6. An image output method, comprising:
an image capturing procedure in which an image is captured;
a photographic parameters acquiring procedure in which the change over time in photographic parameters changed by the user's operation until the image is captured are acquired as relating to the image captured in said image capturing procedure; and
an image processing determining procedure in which the allowable range of processing the image captured in said image capturing procedure to be output is defined based on the change over time in photographic parameters acquired in said photographic parameters acquiring procedure, and the defined allowable range of image processing is displayed to the user.

7. The image output method according to claim 6, further comprising displaying, when a range of processing the image inputted by the user does not fall within the defined allowable range of processing the image, an error message alerting that the inputted range is not allowed.

8. An image operating apparatus, comprising:
a photographic parameters acquiring section which acquires the change over time in photographic parameters changed by a user's operation; and
an image processing determining section which defines the allowable range of processing an image to be output based on the change over time in the photographic parameters.

9. The image operating apparatus according to claim 8, further comprising:
an image capturing section which captures an image,
wherein the photographic parameters acquiring section acquires the change in photographic parameters changed by the user's operation while capturing the image by said image capturing section as relating to the image captured by said image capturing section,
wherein the image processing determining section defines the allowable range of processing the image captured by said image capturing section to be output based on the change in photographic parameters acquired by said photographic parameters acquiring section, and wherein the image operating apparatus further comprises an image processing plan storing section which stores the allowable range of image processing defined by said image processing determining section as relating to the image captured by said image capturing section.

10. The image operating apparatus according to claim 8, further comprising:
an image storing section which stores an image captured by an image capturing apparatus,
wherein the photographic parameters acquiring section acquires the change in photographic parameters changed by the user's operation until said image capturing section captures the image as relating to the image stored in said image storing section,
wherein the image processing determining section defines the allowable range of the image processing when the image captured by the image capturing apparatus is output based on the change in photographic parameters stored in said photographic parameters storing section, and
wherein the image operating apparatus further comprises an image processing plan presenting section in which the allowable range of image processing defined by said image processing determining section is displayed to the user.

11. The image operating apparatus according to claim 8, further comprising an output section which displays, when a range of processing the image inputted by the user does not fall within the defined allowable range of processing the image, an error message alerting that the inputted range is not allowed.

12. An image operating method, comprising:
providing a processor configured to perform a photographic parameters operating procedure in which the change over time in photographic parameters changed by a user's operation; and
an image processing determining procedure in which the allowable range of processing an image to be output is defined based on the change over time in photographic parameters acquired in said photographic parameters operating procedure.

13. The image operating method according to claim 12, further comprising:
an image capturing procedure in which an image is captured,
wherein the photographic parameters operating procedure comprises an photographic parameters acquiring procedure in which the change in photographic parameters changed by the user's operation while capturing the image by said image capturing section is acquired as relating to the image captured by said image capturing procedure,
wherein the image processing determining procedure causes the allowable range of the image processing to be defined when the image captured by the image capturing section is output based on the change in photographic parameters acquired in said photographic parameters acquiring procedure, and
wherein the image operating method further comprises an image processing plan storing procedure in which the allowable range of image processing defined by said image processing determining section is stored as relating to the image captured by said image capturing procedure.

14. The image operating method according to claim 12, further comprising:
an image storing procedure in which an image captured by an image capturing apparatus is stored, wherein
the photographic parameters operating procedure comprises a photographic parameters storing procedure in which the change in photographic parameters changed by the user's operation until the image is captured by said image capturing apparatus as relating to the image stored in said image storing procedure,
wherein the image processing determining procedure causes the allowable range of processing the image stored in said image storing procedure when the image stored in image storing procedure is output is defined based on the change in photographic parameters stored in said photographic parameters storing procedure, and
wherein the image operating method further comprises an image processing plan displaying procedure in which the allowable range of image processing defined in said image processing determining procedure is displayed to the user.

15. The image operating method according to claim 12, further comprising displaying, when a range of processing the image inputted by the user does not fall within the defined allowable range of processing the image, an error message alerting that the inputted range is not allowed.

16. A non-transitory computer readable medium storing thereon a program for an image operating apparatus which operates an image which functions the image operating apparatus comprising:
a photographic parameters acquiring section which operates the change over time in photographic parameters changed by a user's operation; and
an image processing determining section which defines the allowable range of processing an image based on the change over time in photographic parameters acquired by said photographic parameters acquiring section.

17. The computer readable medium according to claim 16, the image operating apparatus further comprising:
an image capturing section which captures an image,
wherein the photographic parameters acquiring section acquires the change in photographic parameters changed by the user's operation until said image capturing section captures the image as relating to the image captured by said image capturing section,
wherein the image processing determining section defines the allowable range of processing the image captured by said image capturing section to be output based on the change in photographic parameters acquired by said photographic parameters acquiring section, and
wherein the image operating apparatus further comprises an image processing plan storing section which stores the allowable range of image processing defined by said image processing determining section as relating to the image captured by said image capturing section.

18. The computer readable medium according to claim 16, the image operating apparatus further comprising:
an image storing section which stores an image captured by an image capturing apparatus,
wherein the photographic parameters storing section stores the change in photographic parameters changed by the user's operation until said image capturing section captures the image as relating to the image captured by said image capturing apparatus,
wherein the image processing determining section defines the allowable range of processing the image stored in said image storing section to be output based on the change in photographic parameters stored in said photographic parameters storing section, and
wherein the image operating apparatus further comprises an image processing plan presenting section which displays the allowable range of image processing defined by said image processing determining section.

19. The computer readable medium according to claim 16, the image operating apparatus further comprising an output section which displays, when a range of processing the image inputted by the user does not fall within the defined allowable range of processing the image, an error message alerting that the inputted range is not allowed.

* * * * *